United States Patent Office 3,458,582
Patented July 29, 1969

3,458,582
PROCESS FOR PRODUCING CARBOXYLIC ACIDS AND NITROGEN CONTAINING INTERMEDIATES FROM OLEFINS
Donald R. Lachowicz, Todd S. Simmons, and Kenneth L. Kreuz, Fishkill, N.Y., assignors to Texaco Inc., New York, N.Y., a corporation of Delaware
No Drawing. Original application June 24, 1965, Ser. No. 466,816. Divided and this application May 31, 1968, Ser. No. 749,237
Int. Cl. C07c 73/00
U.S. Cl. 260—610    1 Claim

ABSTRACT OF THE DISCLOSURE

Nitroalkylperoxy nitrates useful in the preparation of alkanoic and alkandioic acids.

---

This is a division of Ser. No. 466,816 filed June 24, 1965.

This invention relates to a combination process for producing alkanoic and alkandoic acids from alkenes and methyloic substituted alkenes (alkenoic acids). Further, it pertains to subcombination process of converting olefins into the corresponding nitroperoxy (nitroalkylperoxy nitrate and peroxynitrato alkanoic acid) and nitroketone compounds. This invention is still further directed to nitroperoxy products as novel compounds formed as recoverable intermediates in the combination process of the invention.

In the past, many carboxylic acids were not generally available at low cost. For example, the odd numbered chain fatty acids were not available from natural sources and their manufacture from relatively expensive initial reactants was required. One prior means of producing carboxylic acids was by oxidizing the corresponding alcohol or by employing a Grignard synthesis, both of which require relatively costly starting materials. Further, the products obtained by these prior art methods contained impurities which were difficult to remove thereby requiring complicated purification steps which further added to the cost of the product.

We have discovered and this constitutes our invention a relatively low cost method of producing saturated aliphatic carboxylic acids from low cost alkenes and akenoic acids and further have devised method of preparing recoverable nitroperoxy and nitroketone intermediates wherein the nitroperoxy and nitroketone intermediates and carboxylic acid products which are free from minor impurities often occurring in their production which limit their usefulness. We have further isolated and identified for the first time certain novel classes of nitroperoxy compounds.

More specifically, the overall process and the subprocesses of the invention are defined in the following three stages.

First stage

The first stage of the overall process of the invention comprises simultaneously contacting an olefin having at least 6 carbons of the formula:

R—CH—CH—R¹ where R is alkyl (saturated aliphatic hydrocarbon) or polymethylenoic [$(CH_2)_x$COOH where $x$ is an integer of at least 1], R¹ is hydrogen, alkyl, or polymethylenoic, and where at least one of said R and R¹ groups is alkyl, with a mixture of dinitrogen tetroxide and oxygen to form a nitroperoxy intermediate of the general formula:

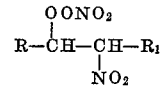

where R and R¹ are as heretofore defined. It is to be noted that the nitro and peroxynitrato groups form on either olefinic carbon with the exception when the olefin group is terminal, the nitro group attaches itself to the terminal olefinic carbon. Therefore, when R¹ is other than hydrogen the nitroperoxy and nitroketone intermediates are actually compound mixtures.

The reaction temperature employed is advanetageously between about −40 and 20° C. Higher reaction temperatures tend to facilitate the decomposition of the peroxy nitrate product and at temperatures below the prescribed range the dinitrogen tetroxide would not function due to its inability to dissociate into monomeric nitrogen dioxide. The reactant mole ratio of olefin to dinitrogen tetroxide to oxygen is normally between about 1:0.5:1 and 1:1.5:30. However, the important aspect of the reactant ratio is that the moles of oxygen be at least equivalent and preferably in excess to the moles of dinitrogen tetroxide. If the ratio of $N_2O_4$ is above that of oxygen another $NO_2$ groups forms rather than the desired peroxy group. Excess oxygen even the excess of the stated range does not deleteriously affect the reaction. The reaction time is normally between the ½ and 10 hours although longer and shorter periods may be employed.

The formed nitroalkylperoxy nitrate or peroxynitrato alkanoic acid depending on the initial olefin reactant is recovered, if desired, by standard means, for example, via stripping volatiles.

It is to be noted that the nitrating agent, dinitrogen tetroxide, is actually an equilibrium mixture of dinitrogen tetroxide and nitrogen dioxide with the equilibrium being driven to essentially 100% dinitrogen tetroxide at 0° C. and essentially 100% nitrogen dioxide at 140° C. Under advantageous conditions, the nitrating agent is normally introduced into the reaction system at a rate of between about 0.002 and 0.02 gram/min./gram olefin, however, the actual rate depends in large measure upon the rate of heat removal from the reaction system.

To promote contact of the reactants in the first stage, the reaction is desirably carried out under conditions of agitation in the presence of an inert liquid diluent, for example, inert liquids having a boiling point between about 30 and 100° C. such as n-hexane, n-heptane, carbon tetrachloride and diethylether.

The olefinic reactant employed should be of at least 6 carbons and preferably less than about 55 carbon atoms although higher molecular weight olefins may be utilized. The contemplated olefinic materials can be derived from many sources such as wax cracking and olefin polymerization. Examples of the olefinic reactants contemplated are 1-dodecene, 1-octene, 1-hexene, 1-octadecene, 4-tridecene, 10-eicosene and $C_nH_{2n-1}$COOH alkenoic acids wherein $n$ is an integer of at least 5 and preferably less than about 54 carbons such as 9-octadecenoic acid (oleic acid), 10-pentadecenoic acid and 4-dodecene-2-oic acid.

The oxygen employed may be in the pure form or in the diluted form such as air or in admixture with inert gases such as nitrogen and argon. Under advantageous conditions the oxygen is introduced into the reaction system at a rate of between about 5 and 18 mls./min./gram olefin.

Examples of the intermediate nitroalkylperoxy nitrate and peroxynitrate alkenoic acid products are 1-nitro-2-dodecylperoxy nitrate, 1-nitro-2-octylperoxy nitrate, 1-nitro-2-octadecylperoxy nitrate, 1-nitro-2-hexylperoxy nitrate, mixture of 5-nitro-4-tridecylperoxy nitrate and 4-nitro-5-tridecylperoxy nitrate, mixture of 11-nitro-10-eicosylperoxy nitrate and 10-nitro-11-eicosylperoxy nitrate, mixture of 10-nitro-9-peroxynitrato octadecanoic acid and 9-nitro-10-peroxynitrato octadecanoic acid, mixture of 10-nitro-11-peroxynitrato pentadecanoic acid and 11-nitro-10-peroxynitrato pentadecanoic acid, mixture of 10-nitro-11 peroxynitrato octadecanoic acid and 11-nitro-10-peroxynitrato octadecanoic acid, mixture of 4-nitro-5-peroxynitrato dodecan-2-oic acid and 5-nitro-4-peroxynitrato dodecan-2-oic acid.

Second stage

The nitroalkylperoxy nitrate or nitratoperoxy alkenoic acid of at least 6 carbons of the formula:

$$\text{R}-\overset{\text{OONO}_2}{\underset{\text{NO}_2}{\text{CH}-\text{CH}}}-\text{R}^1$$

where R and $R^1$ are as heretofore defined recovered from the first stage is contacted with a denitrating agent selected from the group consisting of

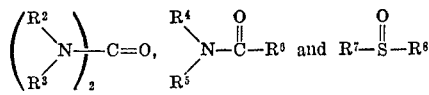

where $R^2$, $R^3$, $R^7$ and $R^8$ are alkyl of from 1 to 5 carbons and $R^4$, $R^5$ and $R^6$ are hydrogen or alkyl of from 1 to 5 carbons. The reactant contacting is conducted, preferably with agitation, at a temperature between about −60 and 70° C. in a mole ratio of denitrating agent to peroxy compound of at least about 1:1 and preferably less than about 20:1 to form a nitroketone of the formula:

$$\text{R}-\overset{\text{O}}{\overset{\|}{\text{C}}}-\underset{\text{NO}_2}{\text{CH}}-\text{R}^1$$

where R and $R^1$ are as heretofore defined. The reaction of the second stage is more or less instantaneous after addition of reactants. The particular mode of bringing the reactants together depends on many things such as molecular weight of reactants and reactivity of the peroxy material. Normally, with the more reactive peroxy materials, the contacting of reactants is accomplished by slow addition of the peroxy intermediate to the denitrating agent.

The nitroketone intermediate product can be recovered by standard recovery processes, for example, via filtration of the solid intermediate after the addition of the reaction mixture to water or via distillation.

Normally, inert diluent is not employed in the second stage of the overall process if one of the reactants is in liquid form. However, if both reactants are in the solid state, then to facilitate interaction inert liquid diluent is employed, for example, inert liquid diluent having a boiling point between about 30 and 100° C. such as pentane, hexane, carbon tetrachloride and diethylether. Agitation of the reaction mixture is also a preferred condition.

Specific examples of the denitrating agents contemplated herein are dimethylformamide, diethylformamide, dimethylacetamide, dimethylsulfoxide, diethylsulfoxide, tetramethylurea and tetraethylurea.

Specific examples of the nitroketone products in the second stage process are 1-nitro-2-dodecanone, 1-nitro-2-octanone, 1-nitro-2-octadecanone, 1-nitro-2-hexanone, mixture of 4-nitro-5-tridecanone and 5-nitro-4-tridecanone, mixture of 11-nitro-10-eicosanone and 10-nitro-11-eicosanone, mixture of 10-nitro-9-keto-octadecanoic acid and 9-nitro-10-keto-octadecanoic acid, mixture of 10-nitro-11-keto-pentadecanoic acid and 11-nitro-10-keto-pentadecanoic acid, mixture of 4-nitro-5-keto-dodecan-2-oic acid and 5-nitro-4-keto-dodecan-2-oic acid.

Third stage

In the third stage of the process the nitroketone having at least 6 carbons of the formula:

$$\text{R}-\overset{\text{O}}{\overset{\|}{\text{C}}}-\underset{\text{NO}_2}{\text{CH}}-\text{R}^1$$

where R and $R^1$ are as heretofore defined recovered from the second stage is contacted with water in the presence of an acid member selected from the group consisting of mineral acid, hydrocarbon sulfonic acid and halo acetic acid having a dissociation constant in excess of $10^{-2}$ at a temperature of between about 0° C. and 150° C. in a mole ratio of nitroketone to acid member of between about 1:1 to 1:10 and in a mole ratio of nitroketone to water of at least about 1:2 to form a carboxylic acid of the general formula:

RCOOH and $R^1$COOH where R and $R^1$ are as heretofore defined. This third stage of the reaction is normally conducted for a period in the range of 15 minutes to several hours. However, the actual reaction time will be dependent in large measure on the kind and strength of the acid member employed. Under preferred conditions, the reaction mixture is agitated in order to facilitate contact between the reactants. Further, if both the acid and ketone are of the solid nature, in order to afford better reactant contact, inert liquid diluent is advantageously employed, for example, inert liquid diluent having a boiling point between about 50 and 150° C. such as acetic acid.

The water contact in the third stage is normally accomplished by first forming the final nitroketone-acid reaction mixture and then contacting with an excess of water, e.g., pouring said reaction mixture into a stoichiometric excess of cold water.

The carboxylic acid product is recovered by standard means such as by filtration or extracting the formed carboxylic acid, e.g., with ether, followed by stripping off the extractant from the extract solution to leave the carboxylic acid as residue.

Examples of the final carboxylic acid products contemplated herein are formic acid, undecanoic acid, heptanoic acid, pentanoic acid, heptadecanoic acid, butanoic acid, nonanoic acid, decanoic acid, azelaic acid, undecadioic acid and glutaric acid.

Specific examples of the acid catalyst contemplated in Stage III are sulfuric acid, phosphoric acid, nitric acid, trichloroacetic acid, methane sulfonic acid, and ethane sulfonic acid. The acids employed are advantageously of an acid strength in respect to aqueous dilution of at least about 70 wt. % of the concentrated state.

The combination process and subcombination processes (Stages I, II, III) of the invention may be further defined by the following equations utilizing dodocene, dimethylformamide and sulfuric acid as the example reactants:

(I) $\text{n-C}_{10}\text{H}_{21}-\text{CH}=\text{CH}_2 + \text{O}_2 + 2\text{NO}_2 \longrightarrow \text{C}_{10}\text{H}_{21}-\overset{\text{OONO}_2}{\underset{}{\text{CH}}}-\text{CH}_2\text{NO}_2$ (II) $\text{C}_{10}\text{H}_{21}\overset{\text{OONO}_2}{\underset{}{\text{C}}}\text{HCH}_2\text{NO}_2 + \text{HCN(CH}_3)_2 \longrightarrow$ $\text{C}_{10}\text{H}_{21}\overset{\text{O}}{\overset{\|}{\text{C}}}\text{CH}_2\text{NO}_2 + \text{HCN(CH}_3)_2 \cdot \text{HNO}_3$ (III) $\text{C}_{10}\text{H}_{21}\overset{\text{O}}{\overset{\|}{\text{C}}}\text{CH}_2\text{NO}_2 + \text{H}_2\text{SO}_4 + 2\text{H}_2\text{O} \longrightarrow$ $\text{C}_{10}\text{H}_{21}\text{COOH} + \text{HOOOH} + \text{NH}_2\text{OH} \cdot \text{H}_2\text{SO}_4$ The following examples further illustrate the invention but are not be construed as limitations thereof.

Example I

This example illustrates the first stage of the overall process, namely, the preparation of the intermediate peroxy compounds from olefins.

Through a mixture of 5 mls. of 1-dodecene and 60 mls. of n-hexane maintained at 0° C. there was bubbled oxygen at a rate of 56.5 mls./min. together with the simultaneous introduction of about 2.2. grams of dinitrogen tetroxide over about a 4 hour period. The volatiles in the final reaction mixture were removed under reduced pressure and the residual product was identified by infrared and nuclear magnetic resonance spectroscopy as 1-nitro-2-dodecylperoxy nitrate.

Example II

This example illustrates the second stage of the overall process, namely, the conversion of the peroxy compound of Example I into the corresponding nitroketone.

In an amount of 7.22 grams (0.023 mole) 1-nitro-2-dodecylperoxy nitrate of Example I was added to 25 mls. of dimethylformamide with agitation at 21–27° C. and the mixture was immediately added to water. The resultant aqueous mixture was filtered and a solid product weighing 4.68 grams was recovered. The solid product was identified as 1-nitro-2-dodecanone representing a yield of 90 mole percent based on the initial dodecene reactant.

Example III

This example illustrates the third stage of the overall process, namely, the conversion of the nitroketone of Example II to the corresponding carboxylic acid.

To 4.68 grams of 1-netro-2-dodecanone prepared in Example II there was added 50 mls. of concentrated sulfuric acid and the mixture was heated with stirring for 15 minutes and then added to a stoichiometric excess of water. A solid product weighing 2.65 grams was recovered by extraction of the resultant aqueous mixture with ether followed by ether evaporation leaving said product as residue. The residual product was identified as undecanoic acid in a yield of 70 mole percent based on the initial dodecene reactant.

Example IV

This example further illustrates the overall process and subprocesses of the invention.

To a magnetically stirred flask there was added 5.4 grams of oleic acid and 60 mls. of n-hexane. The mixture was cooled and maintained at 0° C. and simultaneously bubbled therethrough were oxygen at a rate of 56.5 mls./min. and 1.4 mls. of dinitrogen tetroxide. When all the $N_2O_4$ had been added, the solvent and excess $NO_2$ were removed by vacuum and the residual product was identified as a mixture of 9-nitro-10-peroxynitrato octadecanoic acid and 10-nitro-9-peroxynitrato octadecanoic acid.

The above residual product was cooled to about —20° C. and 25 mls. of dimethylformamide were added thereto and the resultant mixture was stirred for about 0.5 hour in a temperature range between —20 and 16° C. The stirred mixture was then poured into 150 mls. of $H_2O$ and filtered. The filtered solids were water washed and weighed 6.5 grams. They were identified essentially as a mixture of 9-nitro-10-keto octadecanoic and 10-nitro-9-octadecanoic acid representing a yield of 98.5%. This nitroketone product was further purified by successive extractions with water, carbon tetrachloride and ether.

To 30 mls. of glacial acetic acid there was added 1 gram of the above purified nitroketone mixture and 10 mls. of 35% $HNO_3$. The resultant mixture was stirred and heated 3 hours at 110° C. and then poured into cold water (large stoichiometer excess). The resultant aqueous mixture was extracted with ether and the ether extract solution was subjected to distillation to remove the ether leaving a yellowish oil. The yellowish oil was subjected to fractional distillation under reduced pressure and 0.3 gram of olargonic acid and 0.5 gram of azelaic acid were recovered. This represented a yield of 60 mole percent for polargonic and 90 mole percent for azelaic based on the nitroketone reactant.

What we claim:
1. 1-nitro-2-dodecylperoxy nitrate.

References Cited

UNITED STATES PATENTS 3,258,491  6/1966  Lacey et al. _____ 260—610
3,259,638  6/1966  Allison _____ 260—610

BERNARD HELFIN, Primary Examiner

W. B. LONE, Assistant Examiner

U.S. Cl. X.R.

260—75, 413, 533, 597